(No Model.)
T. WOODARD.
SUB SOIL ATTACHMENT FOR PLOWS.
No. 544,553. Patented Aug. 13, 1895.
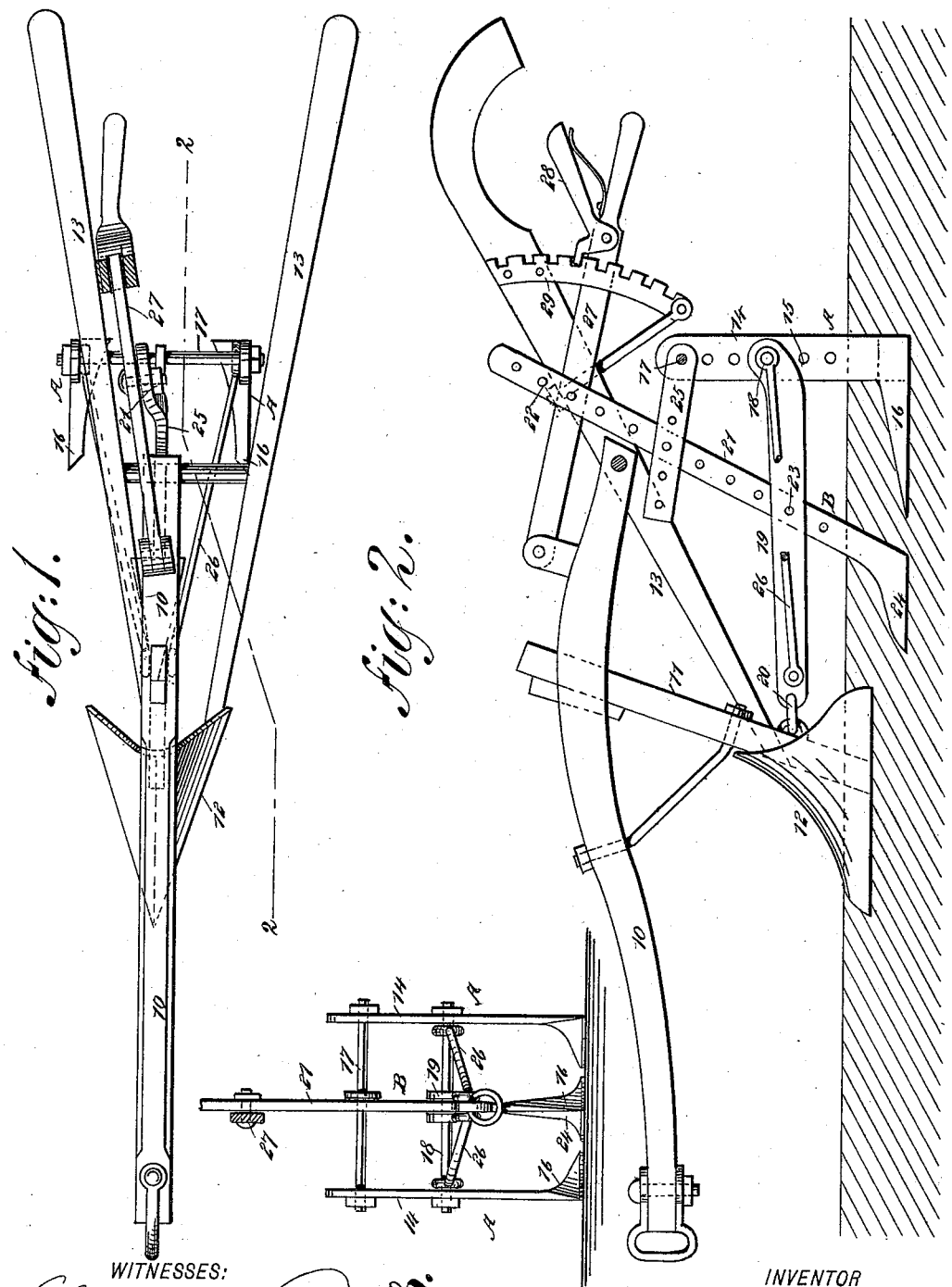
WITNESSES:
INVENTOR
T. Woodard
BY Munn & Co.
ATTORNEYS.

UNITED STATES PATENT OFFICE.

THEODORE WOODARD, OF GARLAND, KANSAS.

SUBSOIL ATTACHMENT FOR PLOWS.

SPECIFICATION forming part of Letters Patent No. 544,553, dated August 13, 1895.

Application filed May 6, 1895. Serial No. 548,324. (No model.)

*To all whom it may concern:*

Be it known that I, THEODORE WOODARD, of Garland, in the county of Bourbon and State of Kansas, have invented a new and useful Subsoil Attachment for Plows, of which the following is a full, clear, and exact description.

My invention relates to an improvement in subsoil attachments to plows, and it has for its object to provide such an attachment which may be applied to any style of plow and which will not be in the way of plowmen, but under a man's complete control.

Another object of this invention is to provide a subsoil plow in which the subsoilers may be adjusted vertically or laterally, as occasion may demand.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of a plow having the subsoil attachment applied, the operating-lever being partly in section. Fig. 2 is a longitudinal section taken substantially on the line 2 2 of Fig. 1; and Fig. 3 is a front elevation of the subsoil attachment, the operating-lever being in cross-section.

The plow illustrated, and to which the attachment is applied, comprises, ordinarily, a beam 10, the stock 11, and the share 12, together with the handles 13. The subsoil attachment consists of two rear subsoilers A and a single forward subsoiler B, the latter being adapted to track the ordinary share, as shown in Fig. 2. The two rear subsoilers each consist of a vertical shank 14, having a series of apertures 15 arranged therein, and a share 16, which may be as wide or as narrow as necessary, the bottom of the share being flat. These shares may be integral with their shanks and are preferably attached thereto, so that they may be changed when necessary.

The shanks of the rear subsoilers A are connected by a cross-bar 17, passed through one of the upper apertures in their shanks, and a second cross-bar 18 is passed through the apertures at the central portions of the said rear shanks, adapted to carry a bifurcated beam 19, the forward end of the said beam being the closed end and provided at this point with a ring 20 or its equivalent, whereby it may be connected with a staple placed upon the stock of the main plow at the rear of the main share.

The forward subsoiler B comprises a shank 21, which is upwardly and rearwardly inclined, being passed between the members of the attachment-beam 19. This shank 21 is provided with a series of apertures 22, and an aperture 23 is made in the attachment-shank, whereby the forward subsoiler may be adjusted vertically and held in adjusted position. The share 24 of the forward subsoiler is provided with a moldboard at each side, or is of what may be termed the "shovel" type, although other forms of share may be employed. The upper portion of the forward subsoiler B is connected with the rear subsoilers by means of a link 25, the connection between the shank of the forward subsoiler and the link being adjustable, and the rear end of the link is mounted upon the upper cross-bar 17.

Brace-bars 26 are attached to opposite sides of the forward portion of the attachment-beam 19 and are carried rearward to an engagement with the lower cross-bar 18 at the rear of the attachment, engaging practically with the shanks of the rear subsoilers. It is evident that through the medium of suitable washers, the cross-bars 17 and 18 being of sufficient length, the subsoil-plows may be adjusted laterally to or from each other, and by reason of the apertures in their shanks they may be adjusted in a vertical direction.

The entire attachment is raised and lowered through the medium of a lever 27, which is preferably fulcrumed upon the rear of the beam 10 of the main plow and extends rearward between the handles 13, being adjustably attached to the standard of the forward plow and being provided with a thumb-latch 28 for engagement with a rack 29 suitably supported on one of the handles.

It is evident that this attachment may be conveniently and expeditiously applied to any plow and as conveniently and expeditiously detached therefrom, if desired.

The subsoilers are interchangeable from the rear of the plow to the beam of the same and may be attached to the beam by clamps or their equivalents. The subsoilers may also be used independently of the regular plow or driven in the furrow behind any other plow. The middle and forward subsoil-plow is much narrower than the rear plows, since the forward one must perform the heaviest portion of the work.

By the use of this improved subsoil-plow the dirt which is loosened below the path of the main plow is left level in the bottom of the furrow and the draft of the plow is so light that a single double team only will be needed to draw said plow.

Having thus described my invention, I claim as new and desire to secure by Letters Patent—

1. A sub-soil attachment for plows, the same consisting of vertically adjustable sub-soil plows, a forward sub-soil plow located between the rear ones and in advance thereof, a draft beam adjustably connected with both the forward and the rear sub-soil plows, and a lifting lever connected with one of the said plows, as and for the purpose set forth.

2. In a sub-soil attachment for plows, the combination, with vertically arranged apertured shanks, of shares attached to the said shanks and adapted for sub-soil purposes, a forward sub-soil plow adapted to track the main share when attached to the ordinary plow, the said forward sub-soil plow having an apertured shank extending in an upwardly direction, an adjustable link connection between the rear sub-soil plows and the forward one, a draft beam adjustably connected with both the forward and rear sub-soil plows at their shanks, and a lever for adjusting said plows, connected with one of them, as and for the purpose specified.

3. In a plow, the combination, with the beam, stock, share and handles thereof, of a sub-soil attachment, the same consisting of two rear sub-soil plows provided with apertured shanks, a forward sub-soil plow located intermediate of the rear ones and likewise provided with an apertured shank, an adjustable link connection between the shanks of the forward and rear plows, a draft beam adapted for engagement with the stock of the main plow and having adjustable connection with the shanks of the forward and rear plows, an adjusting lever fulcrumed upon the main beam of the plow, adjustably connected with one of the sub-soil shanks, and a locking mechanism connected with the said lever, as and for the purpose specified.

THEODORE WOODARD.

Witnesses:
J. A. DURKEE,
L. S. CRAIN.